(12) United States Patent
Schloemer

(10) Patent No.: US 10,084,536 B1
(45) Date of Patent: Sep. 25, 2018

(54) RADIO SYSTEM USING SATELLITES

(71) Applicant: Star Mesh LLC, Princeton Junction, NJ (US)

(72) Inventor: Gerald R. Schloemer, Round Lake, IL (US)

(73) Assignee: Star Mesh LLC, Princeton Junction, NJ (US)

( * ) Notice: Subject to any disclaimer, the term of this patent is extended or adjusted under 35 U.S.C. 154(b) by 0 days.

(21) Appl. No.: 15/656,111

(22) Filed: Jul. 21, 2017

Related U.S. Application Data

(60) Provisional application No. 62/379,601, filed on Aug. 25, 2016, provisional application No. 62/396,181, filed on Sep. 18, 2016.

(51) Int. Cl.
| | |
|---|---|
| *H04W 4/00* | (2018.01) |
| *H04B 7/185* | (2006.01) |
| *H04W 40/12* | (2009.01) |
| *H04W 40/24* | (2009.01) |

(52) U.S. Cl.
CPC ........ *H04B 7/18584* (2013.01); *H04B 7/1856* (2013.01); *H04W 40/12* (2013.01); *H04W 40/246* (2013.01); *H04B 7/18593* (2013.01)

(58) Field of Classification Search
CPC .................... H04W 40/246; H04W 72/0453
USPC .................................................. 370/231–339
See application file for complete search history.

(56) References Cited

U.S. PATENT DOCUMENTS

| | | |
|---|---|---|
| 3,017,777 A | 1/1962 | Haeussermann |
| 4,937,822 A | 6/1990 | Weddle et al. |
| 4,965,850 A | 10/1990 | Schloemer |
| 5,274,840 A | 12/1993 | Schwendeman |
| 5,303,286 A | 4/1994 | Wiedeman |
| 5,410,728 A | 4/1995 | Bertiger et al. |
| 5,566,354 A | 10/1996 | Schloemer |
| 5,757,784 A | 5/1998 | Liebowitz et al. |

(Continued)

OTHER PUBLICATIONS

Cox, Donald C., "Wireless Network Access for Personal Communications," IEEE Communications Magazine (Dec. 1992), pp. 96-115.

(Continued)

*Primary Examiner* — Iqbal Zaidi
(74) *Attorney, Agent, or Firm* — David M. Quinlan, P.C.

(57) ABSTRACT

A radio communication route enables communication from an originating ground station to a destination ground station via one of multiple randomly orbiting satellites with no attitude control. The ground stations and satellites include directional antennas for receiving radio signals from and transmitting radio signals in multiple directions. The satellites store an address of a destination ground station from which an initial information signal is transmitted and antenna information identifying the satellite antenna on which the initial information signal was received. Plural satellite antennas transmit linking information identifying the satellite to the originating ground station. Data transmissions received at the originating ground station that designate a particular destination are transmitted by the originating ground station using the antenna on which the linking information was received and the satellite retransmits the data transmission using the satellite antenna identified by the stored antenna information.

38 Claims, 7 Drawing Sheets

(56) References Cited

U.S. PATENT DOCUMENTS

| | | | |
|---|---|---|---|
| 5,793,842 | A | 8/1998 | Schloemer et al. |
| 5,812,545 | A | 9/1998 | Liebowitz et al. |
| 5,959,999 | A | 9/1999 | An |
| 6,459,899 | B1 | 10/2002 | Schloemer |
| 6,823,170 | B1 | 11/2004 | Dent |
| 6,985,454 | B1 | 1/2006 | Wiedeman et al. |
| 7,502,382 | B1 | 3/2009 | Liu et al. |
| 9,748,989 | B1 | 8/2017 | Freedman et al. |
| 2007/0075896 | A1* | 4/2007 | Whitehead ............. G01S 19/53 342/357.36 |
| 2013/0148250 | A1* | 6/2013 | Day ........................ B64G 1/32 361/149 |
| 2014/0177522 | A1 | 6/2014 | Marshack et al. |
| 2016/0037434 | A1 | 2/2016 | Gopal et al. |
| 2016/0080072 | A1 | 3/2016 | Baudoin et al. |
| 2016/0112117 | A1 | 4/2016 | Platzer et al. |
| 2016/0365629 | A1 | 12/2016 | Yao et al. |
| 2017/0070939 | A1* | 3/2017 | Chong ................. H04W 36/36 |

OTHER PUBLICATIONS

Satellite Systems Engineering in an IPv6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Irridium (last visited May 9, 2017).
International Search Report in PCT/US2017/48110, dated Nov. 3, 2017.

* cited by examiner

RADIO SYSTEM USING SATELLITES

CROSS-REFERENCE TO RELATED APPLICATIONS

This application claims the benefit of U.S. provisional application No. 62/379,601, filed Aug. 25, 2016, and No. 62/396,181, filed Sep. 18, 2016, the entire contents of both of which are incorporated herein by reference.

BACKGROUND OF THE INVENTION

Field of the Invention

The present invention relates to radio mesh systems using satellites in random orbits in communication with ground stations including ground-based receivers and transmitters for cellular telephone communications and Internet connections, and more particularly, to systems and methods of automatically establishing radio routes between ground stations using one or more unguided or substantially unguided satellites deployed randomly or quasi-randomly in low-earth orbits.

Description of Related Art

A brief history of certain aspects of cellular telephony relevant to the present disclosure is set forth in U.S. Pat. No. 5,793,842, which names as an inventor Jerry R. Schloemer, who is also the present inventor. One early system architecture, still in use today, involved a limited number of tower-mounted transceivers ("drops") and plural mobile radios ("cellular telephones"). In these early systems, and still in some cases today, a central computer controlled communications between land lines connected to the towers and the mobile radios. Implementing this system architecture required significant investment in infrastructure and computing power, especially as the increasing popularity and technical capabilities of cellular telephones necessitated increased system capacity and sophistication. An alternate system architecture involved using radio transceivers ("nodes") mounted on existing structures, such as buildings and telephone poles. These architectures use nodes capable of receiving and transmitting signals to and from cellular telephones along a radio route among the nodes to drops at selected nodes. This came to be called a mesh network, an early example being the system disclosed in Cox, Donald C., "Wireless Network Access for Personal Communications," *IEEE Communications Magazine* (December 1992), pp 96-115.

A particular challenge in implementing mesh systems was how to determine the best available radio routes for interconnecting the nodes. Generally, early mesh systems still required a central computer to make routing determinations, which added to system complexity and cost. Other approaches, such as that described in U.S. Pat. No. 4,937,822 to Weddle et al., involved a mesh system in which routes would be established automatically, that is, without a central computer. However, Weddle disclosed such a system only in a mesh in which the nodes are laid out in a regular rectangular grid and radio routing links can only be between nodes orthogonally adjacent to each other (that is, cater-corner links between nodes would not be permitted). The shortcomings of such a system will be immediately apparent to those skilled in the art, if for no other reason than in a real-world setting it would be very difficult, if not impossible, to distribute nodes in a strictly orthogonal, uniformly-spaced rectangular grid over a wide enough area to make the system practicable. Moreover, Weddle does not disclose in detail any algorithm by which the nodes would actually create a preferred radio route.

Against that background the present inventor's U.S. Pat. No. 5,793,842 disclosed a system and method of creating radio routes through a mesh of nodes that were not limited in their placement and did not require a central computer. The systems and methods described in detail further below in connection with the present invention take advantage of technology described in U.S. Pat. No. 5,793,842 relating to the creation of radio routes through plural, randomly located nodes and the transmission of communications using those routes. To avoid the necessity of setting forth here the details of these types of systems and methods, the disclosure in U.S. Pat. No. 5,793,842 relating to route creation, and digital and analog signal transmission using the routes thus created, is incorporated herein by reference as if set out in full.

The present inventor improved on that technology in his later U.S. Pat. No. 6,459,899, which, among other things, describes a system that uses nodes with directional antennas to improve the route creation and communication transmission capabilities of the earlier system. This improvement solves complex issues presented by using nodes with directional antennas in the systems and methods described in the '842 patent, and thus takes advantage of the higher quality radio links achievable with directional antennas. The present invention also uses the technology disclosed in the '899 patent, and its descriptions of route creation are incorporated by reference herein.

Before the inventor's approach to creating routes through a radio mesh network with randomly distributed nodes and no central computer, others were proposing ways to provide worldwide cellular coverage using satellites for call transmission between earth-based originating and destination drops. An example of a satellite system that was actually commercialized is disclosed in various patents such as U.S. Pat. No. 5,274,840 to Schwendeman and U.S. Pat. No. 5,410,728 to Bertiger et al., both of which are assigned to Motorola, Inc. This system utilized satellites evenly distributed in a predetermined number of polar orbits as transceivers for signals between satellites and between satellites and transceivers on the ground. A sufficient number of satellites is used to provide coverage of the entire globe. However, in practice this system, which was commercialized by Iridium, had numerous drawbacks. One was that each satellite needed onboard thrusters, rocket fuel, and navigational hardware to maintain its desired orbit. This increased satellite size and weight, which increased the launch cost, as well as increasing the cost of the satellite itself. Also, to account for inevitable satellite failures, extra satellites would have to be maneuvered into a failed satellite's orbit, thus increasing the cost of the entire system by requiring extra satellites and their concomitant high manufacturing and launch costs. See, for example, "Iridium Satellite Constellation," *Wikipedia*, https://en.wikipedia.org/wiki/Iridium (last visited May 9, 2017). Ground-based orbit and attitude control using complex computer technology further increased system costs. In the end, its drawbacks made the system commercially unviable for mass market applications, although it is believed to have found use in specialized areas such as military applications and reporting by journalists from remote areas.

In addition to maintaining each Iridium satellite in a particular orbital position relative to the earth and other satellites, the attitude of each satellite also had to be maintained within certain tolerances so that its antennas would be oriented for effective satellite-satellite and satellite-ground radio communications. One way of providing attitude control was using onboard thrusters, which present the drawbacks already discussed. Various mechanically-based inertial attitude control systems have been proposed, such as those described in U.S. Pat. Nos. 3,017,777 and 8,164,294, and in Chabot, J. A., "A Spherical Magnetic Dipole Actuator for Spacecraft Attitude Control," Thesis for M.S. in Aerospace Engrg. Sciences, Univ. of Colorado, 2015. However, it is believed that these types of systems would not perform any better than rocket-based attitude control, while their mechanical complexity and onboard control systems would preclude significant savings in weight as compared to rocket-based attitude control.

The present inventor disclosed in his U.S. Pat. No. 5,566,354 a satellite cellular telephone system that improved on the Motorola-Iridium approach. The inventor's improved approach allowed the satellites to occupy random orbits. This eliminated the orbital control components of satellite systems that relied on each satellite being in a known location relative to the others, such as the Motorola-Iridium system or the wireless telephone/satellite system disclosed in U.S. Pat. No. 5,303,286. However, the random-orbit system described in the '354 patent has certain drawbacks, one of which is that the satellites still require attitude control to insure that the satellite antennas point in the correct directions. Nor, as discussed in detail further below, does it have the advantages of a true mesh system, as that term is used in this description.

Aside from the rapid spread of cellular telephone usage around the world in recent years, access to the Internet through computers and smartphones has become a necessity for businesses and individuals alike. It is difficult to do business or manage personal affairs effectively without access to Internet-based resources like email, electronic banking, investigative/search services, and many others. In addition, social media providers like Facebook and Twitter can only exist in areas of the world that provide Internet access. A satellite-based system presents an ideal way of making the Internet and cellular telephone service available in remote areas without blanketing a country with towers or installing land-based radio mesh nodes across vast areas. However, known satellite systems suffer from numerous drawbacks, some of which are discussed above, and none has been successfully commercialized to date. In fact, a low-cost satellite system would have the potential to replace tower-based systems and ground-based mesh systems altogether.

SUMMARY OF THE INVENTION

It is an object of the present invention to provide a radio communication system comprising a plurality of satellites capable of establishing radio links between orbiting satellites and between the satellites and ground-based stations without requiring the satellites to be maintained in predetermined orbits or in predetermined attitudes relative to each other or the earth. In a preferred embodiment there are a sufficient number of satellites to provide a satellite mesh that ensures almost to a certainty that any spot on the earth's surface will be within sight of at least one satellite at all times. One specific embodiment utilizes at least 200 satellites.

The invention rests in part on incorporating in each such satellite a plurality of antennas capable of transmitting and receiving in all directions. The inventor recognized that using a unique antenna arrangement and uniquely coded radio transmissions from the satellites and ground stations, and treating both as nodes in a mesh, would enable a radio route to be established between ground stations by assembling radio links via one or more of the satellites. One insight that led to this aspect of the invention is that the satellites' attitudes and relative positions change sufficiently slowly as compared to the time that it takes the on-board computers in each satellite to calculate a radio route. Accordingly, once the radio route is established, communications ("calls") between the ground stations via one or more of the satellites are not normally disrupted or, in the event that an existing route is disrupted as a satellite moves or tumbles, a new radio route can be established "on the fly" with the same or different satellites while the call is in progress. As used in the description that follows, a "call" is a communication of content (digital or otherwise) over a radio route between satellites or between a satellite and a ground station, unless otherwise indicated explicitly or by context. While not limited as such, the systems described herein are particularly well suited for the transmission of data in packets, defined here in the generally accepted sense as a collection of digital data with a portion representing the content of the transmission (sometimes referred to as the "payload"), and a control portion (sometimes referred to as a "header" or "trailer"), which contains information enabling the payload to be delivered successfully, such as source and destination addresses, error detection codes, and sequencing information.

In one of its more general aspects the present invention uses a unique satellite construction with on-board computers that can perform calculations and select antennas to create radio routes between ground stations via one or more satellites virtually in real time as the satellites move in uncontrolled orbits with no attitude control. The radio routes are determined by algorithms executed by the computers in the satellites, so that a central computer is not needed to specify which satellite or satellites will comprise an optimum radio route between ground stations.

One embodiment of the invention uses the disclosed satellite mesh to create an optimum radio route that comprises a single satellite that provides a radio route between two ground-based transceivers. The unique satellite design described herein enables a single-satellite route to be maintained even as the satellite tumbles with no attitude control or if conditions change so that another satellite in sight of the ground-based transceivers will provide a better radio route because the first satellite drifted out of range or became inoperative for some reason.

A particular advantage of the system disclosed herein is that in a preferred embodiment it provides the above features and those described in more detail below by blanketing the earth with lightweight, battery-powered satellites that reduce launch costs and eliminate the necessity for complex and costly control systems for maintaining the satellites in particular orbits and in particular attitudes. Another aspect of the invention uses ground stations with an antenna arrangement different from that used in the satellites, since the limitations on satellite weight, size, and power do not apply to the ground stations. This means that the ground stations can have a greater antenna density (more antenna beams over a given spherical area) and use antennas with more power (gain), thus virtually ensuring that data communications will be possible between any two ground stations.

These and other aspects and features of the invention and embodiments thereof will be covered in more detail as this description proceeds.

This Summary is provided solely to introduce in a simplified form a selection of concepts that are described in detail further below. It is not intended necessarily to identify key or essential features of the subject claimed herein, nor is it intended to be used an aid in determining the scope of the claimed subject matter.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 2, comprising

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein. It will also be understood that terms indicating direction or orientation may be used facilitate description. The use of such terms does not imply that the claimed subject matter is limited to a particular orientation of the structure being described.

I. RADIO MESH CONCEPTS AND PRINCIPLES

The system described herein builds on certain principles underlying the use of a plurality of transceivers ("nodes") that can be used to form termination points for links in a radio route using one or more of the transceivers. Throughout the description herein, the term "radio," "radio signal," or the like is not limited to references to electromagnetic radiation in frequencies commonly referred to as radio waves. It is meant to encompass electromagnetic radiation of any frequency capable of transmitting information, including light, microwaves, VHF ("very high frequency"), UHF ("ultrahigh frequency"), etc. The discussion in this section describes certain relevant features of prior art arrangements sometimes referred to as mesh systems, and some of the basic concepts that represent the significant advances over known mesh technology achieved by the unique apparatus, systems, and methods described herein.

A. Prior Art Mesh and Satellite Radio Communication Systems

Figure 1A:
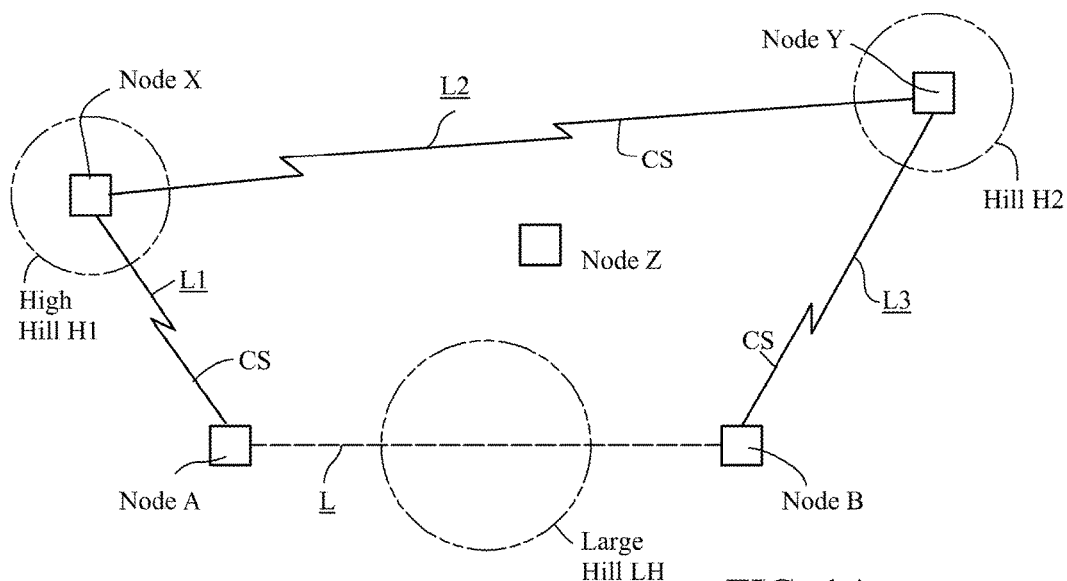
FIG. 1, comprising FIGS. 1A and 1B, schematically depicts the radio mesh concept disclosed in the inventor's U.S. Pat. Nos. 5,793,842 and 6,459,899.
Figure 1B:
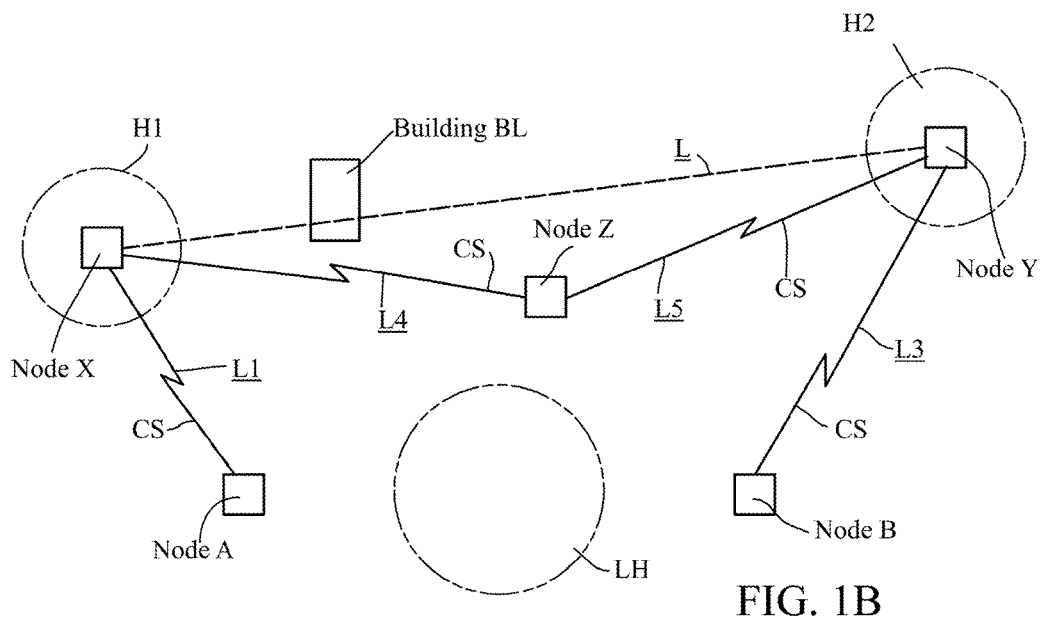

Existing ground-based radio mesh systems such as those described in the inventor's U.S. Pat. Nos. 5,793,842 and 6,459,899 have proven very effective in establishing radio routes for digital and analog communication signals through a plurality of nodes. They are capable of establishing high quality radio links in a mesh system that allows nodes to be placed at convenient locations rather than in a predetermined pattern. FIGS. 1A and 1B illustrate such a ground-based radio mesh. In this simplified example, communication signals CS can be transmitted between an originating node A and a nearby mobile radio (not shown), such as an Apple Inc. iPhone® or Samsung Electronics Co., Ltd., Galaxy® so-called smartphone. Those signals must be in turn communicated to a "drop," such as a node B, which can be an Internet router or a telephone network, for example, connected to a land line. If the nodes A and B are not in line-of-sight contact because of the presence of an obstruction between them, such as a large hill LH (FIG. 1A), a direct radio link L may be subject to a severe reduction in signal strength, if it is possible to establish a link at all.

As described above, many mesh systems proposed before those described in U.S. Pat. Nos. 5,793,842 and 6,459,899, used a central computer to control routes between originating nodes and drops. However, the patents disclosed systems that utilized algorithms to enable the nodes themselves to establish a preferred route between as many intermediate nodes as needed to optimize communications between an originating node and a destination node. For example, FIG. 1A shows a system in which software and firmware in the nodes themselves establish a preferred route around the hill LH, comprising a radio link L1 between the node A and a node X on top of a first high hill H1. The algorithms in the nodes use a link L1 between nodes A and X, even though the link actually leads in a direction away from the destination node B. The algorithms resident in the individual nodes then establish a radio link L2 with another node Y on top of a second hill H2, and thence to the destination node B. In this preferred route, a node Z in the mesh, which may be part of a radio route between two other nodes (not shown), is bypassed because the algorithms in the nodes X, Y, and Z self-determine that the preferred route is through the nodes X and Y.

One of the important features of this system is that the nodes themselves can also create a different preferred route, say between the nodes X and Y through a node Z using links L4 and L5, if conditions change after placement of the nodes. FIG. 1B shows how the nodes themselves can create a different route between nodes A and B if there is no clear line of sight between them. in this example, the line of sight has been interrupted by a building BL constructed directly between the nodes X and Y. Another example would be a tree that permits radio signals to pass between the nodes X and Y during the winter because it has no leaves, but disturbs a radio link in the summer when its leaves have come out. In such a case, the systems described in U.S. Pat. Nos. 5,793,842 and 6,459,899 enable the nodes A, B, X, Y, and Z automatically to create a new preferred radio route using the new radio links L4 and L5 between the nodes X, Y, and Z.

These patents thus describe systems that use a mesh of nodes capable of essentially random distribution in which the nodes themselves establish preferred radio routes between destinations and drops using the onboard computational capabilities in the nodes to execute algorithms that analyze radio signals exchanged by the nodes. This eliminates the need for a central computer to communicate with the nodes and determine optimum or preferred routes using data collected by the nodes from multiple other nodes in the mesh. Generally speaking, the only limitation on the placement of the nodes is that intermediate nodes in a route of three or more nodes should be within sight of at least two other nodes. This allows the system to cover a wide area, and although it may require a large number of nodes to do so, as long as nodes can "see" each other the system will be able to self-establish preferred radio routes.

However, it is not obvious how general concepts behind radio mesh systems comprising fixed-location, ground-based receiving and transmitting nodes can be adapted to a system in which the nodes are satellites orbiting the earth. The Motorola-Iridium system disclosed in U.S. Pat. Nos. 5,274,840 and 5,410,728 is more or less an analog of ground-based systems with nodes in particular locations. That is, it requires the satellites to maintain predetermined orbits and have onboard attitude control to keep the satellite antennas pointing in the right direction, and relies on knowing the locations of the satellites when they receive a transmission from one ground station and retransmit it to another. While this approach works technically, it is believed to have proved impracticable from a commercial standpoint because it was too costly to implement, although as noted above, it still has utility in certain specialized applications. In addition, it uses a central computer to establish radio routes among the satellites.

The inventor's U.S. Pat. No. 5,566,354 discloses a system using random-orbit satellites, but as noted above, it is not actually a mesh system as that term is used herein. For example, the system in the '354 patent establishes a communication channel between ground-based mobile units by having an originating unit send a page to a destination unit to determine if a satellite is available for the purpose, and then simply transmits communications between the two units through that satellite. The system does not have numerous salient features of the mesh system described herein, such as creating preferred radio routes using the quality of signals transmitted to and received by multiple nodes. In addition, the satellites still require expensive onboard attitude control hardware such as positioning thrusters and rocket fuel for them, both of which add extra weight and thus increase the cost of delivering the satellites into orbit. The present system, on the other hand, uses satellites that continuously update the antennas in the nodes (satellites and ground stations) to enable a choice to be made as to the antennas at the nodes that will provide the highest quality radio link between the nodes, whether they be satellites or ground stations. In addition, the '354 patent does not disclose how to provide satellite-to-satellite communications between randomly orbiting satellites. And although the Motorola-Iridium system supports satellite-to-satellite communications, its satellites have to maintain both prearranged orbits and fixed attitudes.

B. Principles of the Unique Satellite Radio Mesh Systems Described Herein

The satellite radio mesh used in the present system supports radio routes in which the preferred route between two ground stations includes more than one satellite and having one or more satellite-to-satellite radio links. It also supports radio routes that include a single satellite in communication with both ground stations. In both embodiments a large number of unique satellites, described further below, are launched into orbit. The number of satellites is chosen to provide a high probability that at any given moment, a point on the surface of the earth will be within line of sight of a certain number of satellites. For example, U.S. Pat. No. 5,566,354 estimates that if 200 satellites were randomly placed at an orbital altitude of 500 miles, a given point on the earth would "see" on average over time about 12 satellites, or stated another way, the chances of a given spot on the earth not being in the line of sight of at least one satellite is only four in 1,000,000.

Figure 2A:
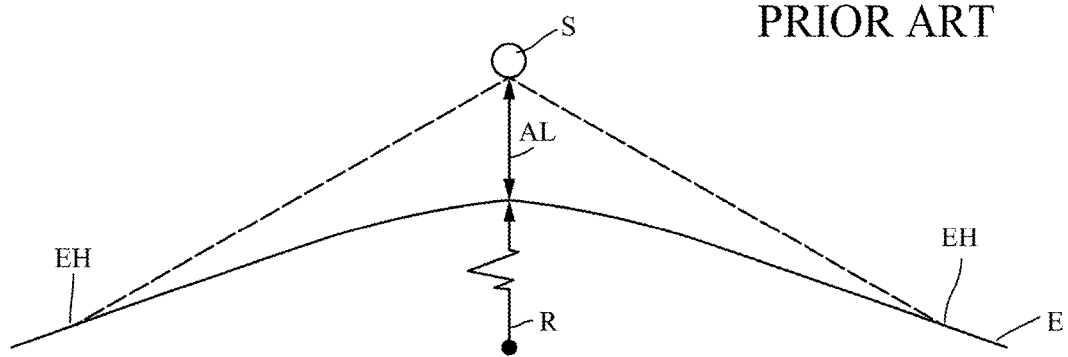
FIGS. 2A and 2B, illustrates certain geometric principles underlying the space-based radio systems disclosed and claimed herein.
Figure 2B:
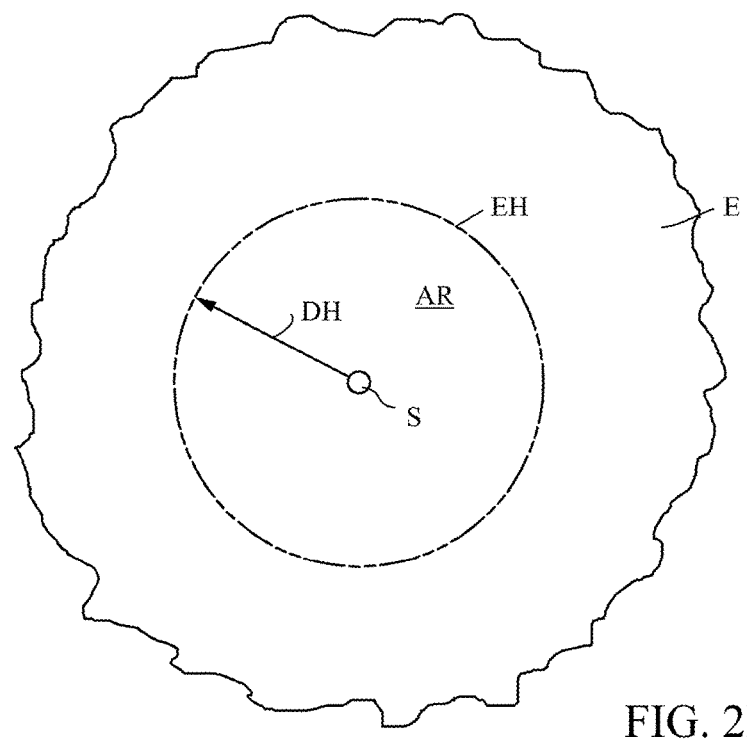

FIGS. 2A and 2B illustrate this principle graphically. The approximate distance DH to the horizon EH from a satellite S at an altitude AL of 500 miles can be calculated according to the formula $DH=[(R+500)^2-R^2]^{1/2}$, where R is the radius of the earth E. Depending on the value chosen for R, DH is about 2000 miles. Thus, the area of coverage AR of a satellite is $\pi \times DH^2 \cong 12,500,000$ sq. mi. Taking the surface area of the earth as 197 million square miles, each satellite thus "covers" about 6% of the earth's surface, which means that on average any one point on the surface will "see" about 12 satellites (200×0.06). Conversely, the chance that a single satellite will not be visible from any particular point on the earth is 94%. If there are 200 satellites launched into random orbits, the probability that any given point on the earth will not see at least one satellite is only $0.94^{200} \cong 0.0004\%$ (that is, four in a million). The '354 patent includes a table, incorporated herein by reference, that shows the estimated probability of constant coverage over time of a point on the surface for different numbers of satellites.

It should be noted that the term "random orbits" in the context of the present description must be considered in combination with the number of satellites used in the system. It generally means that a sufficient number of satellites are placed into orbits that are initially spaced apart with the goal of maximizing coverage of the globe. It is not meant to require random distribution in a pure mathematical sense. Rather, it is used to indicate that precise positioning of satellites at particular locations is not required, and that the manner of placing them into orbit will take into account the number of satellites comprising the system and the desired degree of certainty, calculated in accordance with suitable statistical algorithms, that any given point on the earth's surface will be within sight of at least one satellite at all times. (It will be appreciated that the system permits different satellites to satisfy that requirement for a given point as the satellites' orbits change over time.) For example, known algorithms for generating so-called pseudorandom numbers can be used as a basis for calculating initial satellite numbers and placement. Other ways of achieving "random" satellite distribution are described in U.S. Pat. No. 5,566,354 in the "Satellite Launch" section, which is incorporated herein by reference. The number of satellites launched into orbit will preferably be in excess of a calculated number to enable continued full earth coverage by accounting for a certain number of satellite failures over time, or for satellites that are destroyed by reentry into the earth's atmosphere because of orbit decay or damaged by space debris.

Another important feature of the system described and claimed herein is that the satellites do not require onboard attitude control. Thus, they do not require any moving parts, mechanisms, or propulsion systems, which reduces satellite weight and cost, and they can be released into orbit without regard to their angular orientation. It is expected that satellites can deployed from a launch vehicle such as a space station or the like. It will be preferable to attempt to deploy them with as little angular velocity as possible, but no special effort is required in that regard. The system described herein will create radio routes even if the satellites "tumble," meaning that each satellite can change its angular orientation at a rate different from other satellites, or not at all, as it orbits. Stated another way, the satellites are neither in prescribed orbits nor in controlled orientations. If desired, each satellite can include tracking telemetry to detect when its orbit is decaying and it needs to be replaced, and to comply with any national or international protocols applicable to orbiting bodies. However, it is expected that it will be relatively simple and inexpensive to provide such telemetry.

II. SATELLITE DESIGN: ANTENNA CONFIGURATION AND ONBOARD CONTROL CIRCUITRY

The tumbling satellites comprise system nodes that utilize unique multiple antenna arrays and software-implemented algorithms to create radio routes by enabling the nodes to nearly instantaneously identify an antenna transmitting information signals and an antenna in another node receiving information signals from that transmitting antenna. Because the satellites and ground stations are generally equivalent vis-à-vis their function as nodes in the system, the term node can refer to both satellites and ground stations, unless otherwise stated or the context indicates otherwise. In addition, software resident in each node uses content in the information signals to evaluate the suitability of these antenna pairs as a radio link between two nodes. Software resident in the nodes uses that evaluation to create a preferred radio route for sending data communications from an originating ground station to a destination ground station. For purposes of explaining basic concepts involved in creating radio routes using the satellite system described herein, this discussion sometimes treats certain aspects of route creation separately. For example the concept of identifying antenna pairs for potential radio links may be described separately from identifying a preferred radio route selecting certain links for a radio route. Nevertheless, it will be clear as the discussion proceeds that route creation involves a combination of steps that begins when ground nodes send initial information signals and culminates with the creation of a preferred radio route for communication signals from an originating ground node through one or more satellite nodes to a destination ground node.

The disclosed system and route creation process enables the use of satellites that drift in random orbits with no attitude control. Data communications can be transmitted and received even if the selected pair of antennas on the nodes changes over time, or if the satellites comprising the route change over time. That is, algorithms onboard the satellites and at the ground stations are capable of changing the radio route during a given communication or from one communication to the next. In addition, a radio route might utilize different satellites during a single communication. Or a first communication between ground stations at a first time could use a certain satellite or satellites, while a later communication between the same two ground stations might use one or more satellites not used in the first communication.

Figure 3:
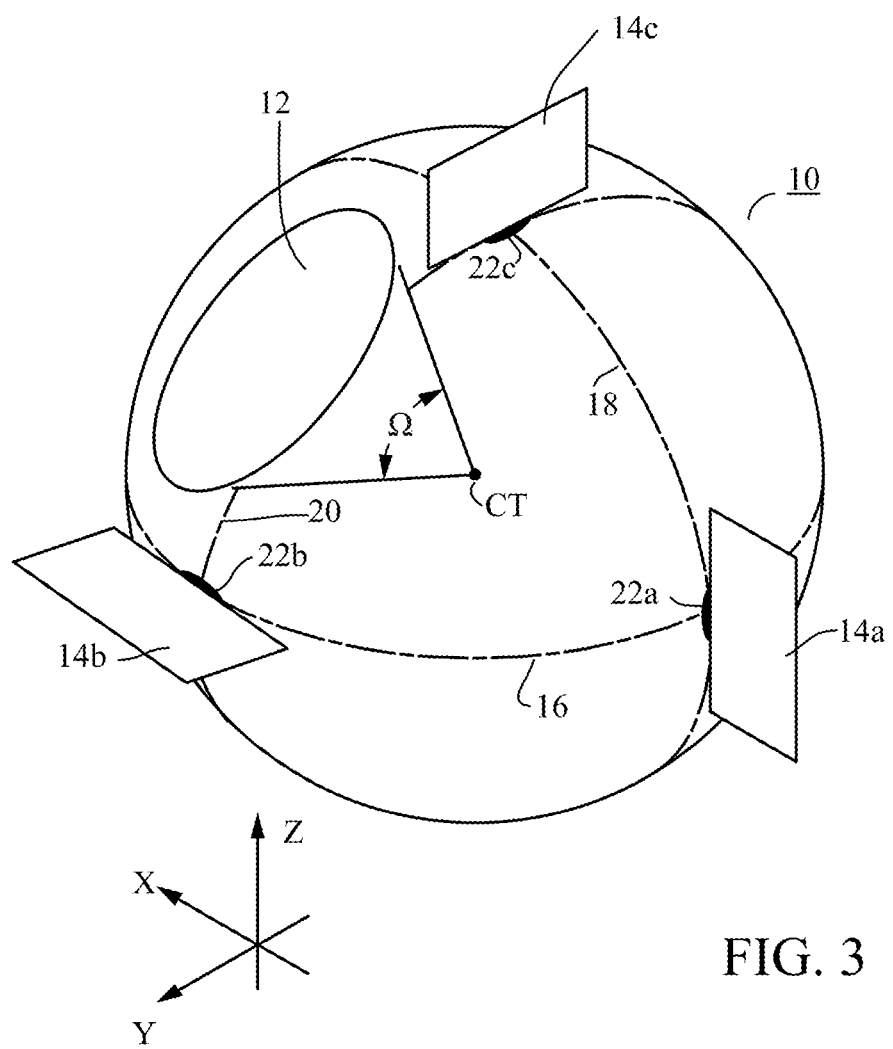
FIG. 3 schematically depicts an embodiment of a satellite suitable for use in the space-based radio systems disclosed and claimed herein.

FIG. 3 is a schematic depiction of an embodiment of a satellite 10 that can be used in the space-based radio mesh systems described herein. To facilitate understanding of certain principles underlying the operation of the satellite 10 in the systems and methods described herein, it is shown with an outer casing 12 in the shape of a sphere centered at CT. Those skilled in the art will recognize that the satellite can have a different shape if so dictated by other design considerations. Certain features of the satellite will be described with reference to a coordinate system having mutually orthogonal x, y, and z axes. It will be understood as this description proceeds that one of the features of the space-based radio system disclosed and claimed herein is that the satellite can assume any angular orientation as it orbits the earth, as already discussed. It will be appreciated by those skilled in the art from the description thus far that the coordinate system shown in FIG. 3 is used strictly for purposes of illustration in describing features of the satellite. Put another way, the coordinate system can be considered to be tied to the satellite and to change its angular orientation with respect to the earth as the satellite slowly tumbles.

The exemplary satellite 10 includes a plurality of antenna modules 12, one of which is depicted schematically in FIG. 3 for purposes of illustration. Each antenna module in this example comprises a directional antenna that transmits and receives radio signals at greater powers in predetermined directions. The present embodiment uses circular dish parabolic antennas each of which occupies a solid angle fl with a vertex at the center CT of the spherical satellite. The number of discrete antenna modules incorporated into the satellite will depend on the particular application of the system and the antenna design. In one embodiment Ω in steradians will be chosen so that a particular number of antenna modules, distributed around the satellite, will be capable of transmitting radio signals to and receiving radio signals from a sufficiently large spherical area to enable radio signals to be received from and transmitted to ground station transceivers and antennas in other satellites to effect operation of the system in the manners described below. The actual configuration of the antenna modules 12 can be determined using known antenna design principles to achieve that goal.

However, fundamental principles of antenna operation demonstrate the technical feasibility of equipping a satellite such as that depicted in FIG. 3 with a sufficient number of antennas to effect the system and methods described herein. One design approach could specify that the beam width of the antenna for each module must provide a certain probability that signals transmitted from all of the antennas in a particular satellite will be received at another satellite or a ground-based transceiver. A typical manner of expressing beam width for a circular dish parabolic antenna is the angle α at which the power of the beam has decreased by 3 dB. This is referred to as the half-power beam width (HPBW) and is given by the relationship:

$$\alpha = \frac{k \times \gamma}{d}$$

where α is in degrees, k is a factor that depends on certain design parameters of the antenna and is typically assigned a value of 70°, γ is the wavelength in centimeters, and d is the diameter of the circular "mouth" of the antenna reflector. *Satellite Systems Engineering in an IPv6 Environment*, Minoli, Daniel, CRC Press, Boca Raton, Fla. (2009), pages 78-80. For a 5 GHz signal, which is a common radio frequency (microwave C band) used in satellite communications, $\gamma=6$ cm ($\gamma=c/f$, where c=speed of light, $3\times10^{10}$ cm/sec), so $\alpha \cong 140°$ for an antenna with a diameter d=3 cm. Under reciprocity principles, the same parabolic antenna would receive signals arriving at 70° off-axis at −3 dB of its on-axis gain. It will be appreciated that the design details of the antennas do not form a part of this disclosure. The principles of operation of the system as described herein will enable one skilled in the art to select or design antennas that enhance the probability that antennas on the random-orbit satellites will be able to establish radio links with other satellites and ground stations.

A satellite used in the present system will have to be large enough to accommodate the various electronic and mechanical components required for satellite operation, discussed below in detail in connection with FIG. 4, as well as being sufficiently robust in construction to withstand the stresses of launch and long-term exposure to the hostile environment it will encounter in orbit. It is expected that a satellite with a diameter of 20 cm (approx. 8 in., about the size of a soccer ball) will suffice, in which case the surface area of the spherical satellite 10 is $400\pi$ cm$^2$ ($4\pi \times (10$ cm$)^2$). The opening at the surface of the satellite for each antenna will be a size that permits the beam from the reflector below the surface to spread unimpeded. If the opening in the satellite is a circle 6 cm in diameter, its area is $9\pi$ cm$^2$ ($\pi \times (3$ cm$)^2$). Thus, the opening for each satellite will occupy 2.25% of the surface area of the satellite ($9\pi/400\pi$). If 25 antennas were used, they would occupy over 60% of the satellite surface.

It will be appreciated that satellites and antennas suitable for use in the present mesh system can take different forms depending on trade-offs familiar to those skilled in engineering complex systems. As described further below in more detail, one of the steps in creating a radio route using the embodiment of a satellite mesh described herein is the transmission of identifying messages from all of the antennas in one or more satellites and ground-based transceivers, which in certain contexts are referred to herein interchangeably as "nodes." It will be seen that increasing the number of antennas in a node will increase the total spherical coverage of radio signals transmitted from and received by other nodes, which in turn will increase the probability that a signal from one node will be received at another. It will be further appreciated that more antennas per satellite might make it possible to reduce the number of satellites placed in orbit. Such satellites might be more expensive and heavier, thus increasing launch costs, but other factors might offset the increased cost because fewer satellites might need to be launched. Those skilled in the art will also recognize that the system described herein can be implemented with satellites having antenna arrays that transmit with less than full 360° spherical coverage.

By the same token, the increased weight of a ground station due to adding antennas is not a factor. Thus, a system might incorporate satellites with fewer antennas than the ground stations. It might also be more feasible to design the satellites with a given number of antennas and use statistical estimates to calculate the number of such satellites needed to ensure that a predetermined number is visible from any given point on the earth's surface. After the satellites are launched into orbit, the system could be tested to confirm the calculations and more satellites could added if desired. Moreover, the present example uses parabolic antennas to explain certain principles involved in node design, but the system does not rely on using a particular type of antenna. That is, the type of antenna and the specific antenna design will also be factors in determining the beam width and number of satellites necessary to ensure to a suitable probability that nodes will receive signals transmitted from other nodes at a useful gain. The factors that determine a successful design for any given implementation of mesh systems as described and claimed herein will be well understood by those skilled in the art.

The satellite 10 also includes a plurality of solar panels, three of which 14a, 14b, and 14c, are shown in FIG. 3. In the illustrated embodiment the solar panels are oriented in mutually perpendicular planes and spaced equidistantly around the satellite 10. For purposes of describing the locations and orientations of the solar panels in this embodiment, a satellite equator 16 is defined as the great circle where the satellite surface is intersected by a plane parallel to the x-y plane and passing through the center CT of the sphere. A zero meridian 18 is defined as the great circle where the satellite surface is intersected by a plane parallel to the x-z plane and passing through the center CT of the sphere. And a normal meridian 20 is defined as the great circle where the satellite surface is intersected by a plane parallel to the y-z plane and passing through the center CT of the sphere. The solar panel 14a is attached to the satellite by suitable mounting structure 22a at the intersection of the equator 16 and the zero meridian 18. The solar panel 14b is attached to the satellite by suitable mounting structure 22b at the intersection of the equator 16 and the normal meridian 18. And the solar panel 14c is attached to the satellite by suitable mounting structure 22c at the intersection of the zero meridian 18 and the normal meridian 20.

The solar panels are generally planar with solar cells distributed over one or both faces for generating electricity when the solar cells are exposed to sunlight. For maximum effectiveness, the planar solar panels are mounted in mutually orthogonal planes to ensure that an adequate number of solar cells are exposed to sunlight regardless of the angular orientation of the satellite. In the depicted embodiment, the solar panel 14a lies in the x-z plane, the solar panel 14b lies in the x-y plane, and the solar panel 14c lies in the y-z plane. It will also be appreciated that the satellite includes three more companion solar panels where the equator, zero meridian, and normal meridian intersect on the other side of the satellite. The companion solar panels (depicted with a prime (') in FIG. 4) are preferably oriented in the same planes as each of their counterparts 14a, 14b, and 14c shown in FIG. 3. Each solar panel is preferably normal to the surface of the satellite so that it does not obstruct the transmission and receipt of radio signals by antennas adjacent to the solar panels.

It will be appreciated that FIG. 3 is intended solely to illustrate features of the satellite 10 necessary to an understanding of the present embodiment of the satellite mesh system described herein. Those skilled in the art will understand that an actual satellite for implementing the present system may have design features not shown in FIG. 3's schematic depiction. For example, good design practice may dictate that the mouths of the antennas be recessed below the surrounding surface of the satellite to reduce the possibility of impact damage by space debris, Or additional protection might be provided by covering each antenna mouth (recessed or not) with a sheet of material transparent to signals transmitted by and received at the satellite. The design and placement of the solar panels 14 shown in FIG. 3 is also highly schematic, and the invention disclosed and claimed herein is not limited to any particular solar panel configuration, placement, or means of deployment.

Figure 4:
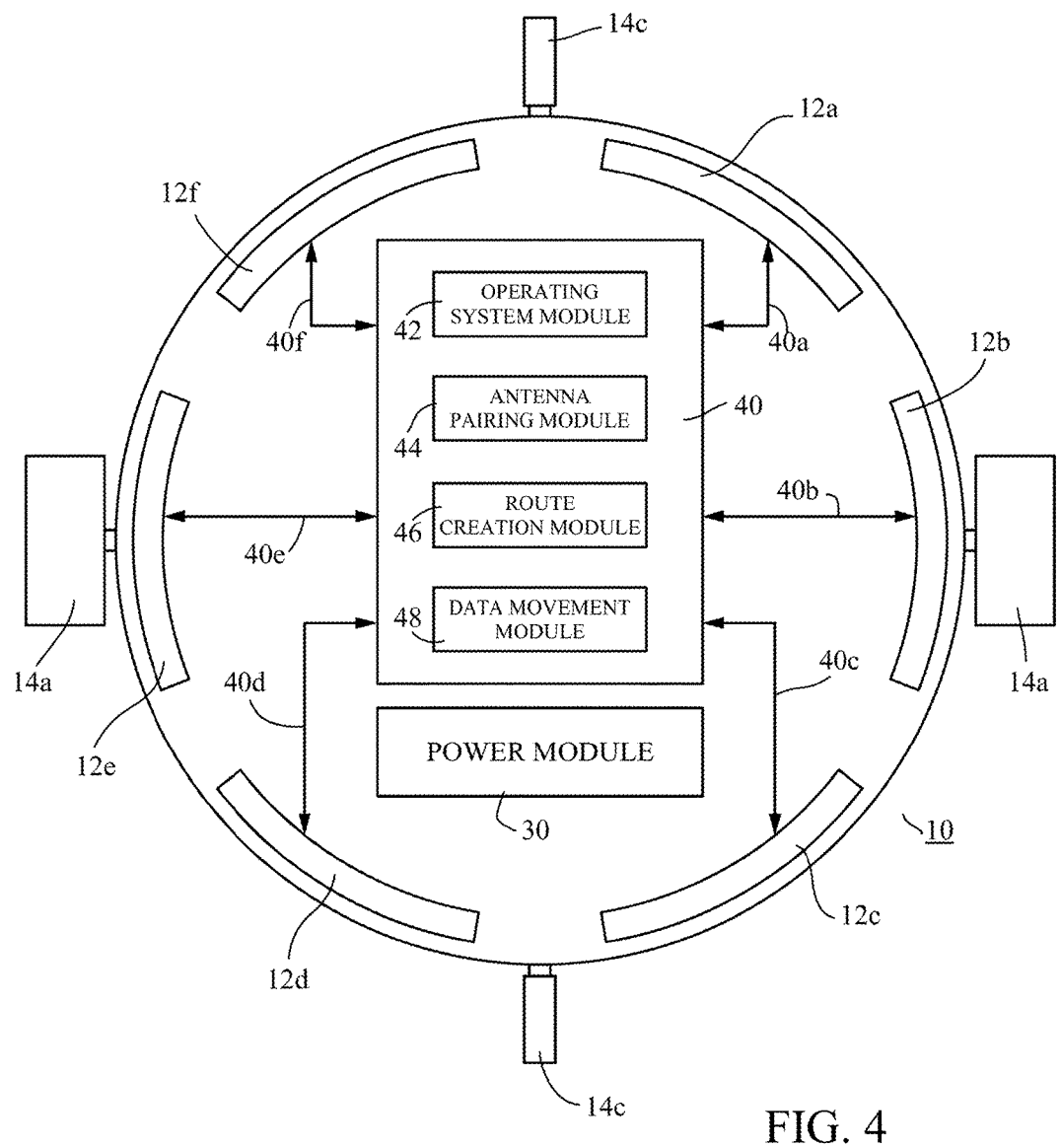
FIG. 4 is a representation of various operational components of the satellite depicted in FIG. 3.

FIG. 4 illustrates schematically various components housed by the satellite 10 (node) for creating a radio route capable of transmitting and receiving radio signals to and from other nodes. As those skilled in the art will readily recognize, in the descriptions of this and other embodiments and aspects of the radio systems comprising the subject matter disclosed and claimed herein, the control circuitry and components described and depicted in the various figures are meant to be exemplary of any electronic computer system capable of performing the functions ascribed to them. Such a computer system will typically include the necessary input/output interface devices and a central processing unit (CPU) with a suitable operating system and application software for executing program instructions. In addition, terms referring to elements of the system, and of the user interfaces described herein, are used herein for simplicity of reference. For example, the terms "component," "module," "system," "apparatus," "interface," or the like are generally intended to refer to a computer-related entity, either hardware, a combination of hardware and software (firmware), software, or software in execution, unless the context clearly indicates otherwise. For example, such a component may be, but is not limited to being, a process running on a processor, a processor, an object, an executable, a thread of execution, a program, and/or a computer. By way of illustration, both an application running on an electronic computing device and the device itself can be a component. One or more components may reside within a process and/or thread of execution and a component may be localized on one computer and/or distributed between two or more computers.

Referring in more detail to FIG. 4, the satellite 10 is depicted in a view in the x-z plane in FIG. 3. It will be appreciated that FIG. 4, like other depictions used herein to describe the subject radio systems and their components, is not to scale. It depicts the solar panels 14a and 14c, as shown in FIG. 3, as well as the diametrically opposed companion solar panels 14a' and 14c' mentioned above. It also schematically depicts a plurality of antenna modules 12a, 12b, 12c, 12d, 12e, and 12f, representing all of the antenna modules onboard the satellite 10, for transmitting and receiving radio signals as discussed above in connection with FIG. 3. This schematic depiction is intended to convey the principle of operation of the present embodiment whereby the plurality of antenna modules in combination will be capable of transmitting and receiving radio signals to and from a node in substantially all radial directions. (However, as already noted, the system described herein can also be implemented with satellites having antenna arrays that transmit with less than full 360° spherical coverage.)

The satellite 10 includes a power module 30 capable of providing a reliable source of electrical power for operating the components of the satellite. The power module 30 includes batteries that are charged by the electricity generated by the solar panels. Suitable power regulating equipment provides steady-state power to the various electronic components carried by the satellite even though the solar panels will spend one half of each satellite orbit out of sight of the sun. In addition to the power module the satellite includes a central processing unit 40 with an operating system module 42 that stores operational software for controlling the various functions of the satellite. As shown in FIG. 4, the CPU 40 is operatively connected to all of the antenna modules 12 via power and data links 40a, 40b, 40c, 40d, 40e, 40f, etc.

FIG. 4 also illustrates four main operational modules under the control of the operating system module. These components are likewise included in ground-station nodes. Each satellite node in a radio route necessarily uses two antenna modules. Since the satellites have no preferred orientation, it is necessary for each satellite (node) to select antenna modules 12 to communicate with another node, either a satellite or a ground station. An antenna pairing module 44 under the control of the operating system uses information messages received from other nodes (ground stations or other satellites) to pair an antenna module in one node for transmitting/receiving signals with an antenna module in another node for receiving/transmitting signals. The radio signals exchanged between nodes are analyzed by a route creation module 46 that uses algorithms discussed further below to create a radio route between two ground stations. (Ground station nodes have corresponding central processing units.) Once a radio route has been established, a data movement module 48 within each node controls the transmission along the radio route of communication signals CS (see FIG. 1). As suggested above, the illustration in FIG. 4 of separate modules for antenna pairing and route creation does not necessarily imply that identifying antenna pairs for transmitting/receiving signals between nodes and selection of potential radio links as a radio route are other than part of a more or less unitary process of creating a preferred radio route for transmitting data communications from one ground station to another.

III. CREATING RADIO ROUTES FOR DATA COMMUNICATIONS

Launching sufficient numbers of the satellites 10 in random or pseudorandom orbits as discussed above enables implementation of a variety of route creation strategies. This section will discuss two embodiments, and variations thereof, of radio routes created using such a satellite system. One embodiment creates a radio route that comprises radio links between a single satellite and two ground stations. Another embodiment, which allows for communications over longer distances, creates a series of one or more subroutes comprising a first ground station, a first satellite and a second ground station, and another subroute comprising the second ground station, a second satellite, and a third ground station, and if necessary a third subroute comprising the third ground station, a third satellite, and a fourth ground station, and so forth. This radio route would enable communications between a first ground station and an $n^{th}$ ground station using n−1 satellites. Variations on these embodiments are discussed below as well. For example, those skilled in the art will understand that a radio route can also include satellite-to-satellite links if the algorithms resident in the nodes assemble such a route based on the principles discussed below.

The ability to transmit data between ground stations using radio routes according to this embodiment of the present system is essentially confirmed by the known operational capability of the Motorola-Iridium system, which uses fixed satellites with attitude control. That type of system was able to establish communication links directly between satellites and hand-held units on the ground in spite of the limited antenna power (or gain) available in such units. Thus, an embodiment of the present system that uses antennas with limited power in the satellites in combination with ground stations having more powerful, different type, and/or a greater number of antennas is virtually assured of being able to establish radio routes between two ground stations.

A. Two Ground-Station/One-Satellite Radio Route

A basic embodiment of a satellite mesh system according to the present invention uses one of the satellites in accordance with the above description to create a radio route for communications between two ground stations. This route involves two radio links, one between a first ground node and a satellite node, and the other between that satellite node and a second ground node. Although the configuration of a ground station may be different from that of the satellites, conceptually the transmission and reception of radio signals are processed by each essentially the same way. The creation of radio routes may be enhanced by ground station nodes using more and/or more powerful antennas, as well as different antenna types, as compared to those carried by the satellites, since the nodes on the ground do not have the same constraints on weight, power, and space limitations as the satellites. In addition, the ground station antennas can be mounted on tall buildings, towers, high hills, etc., to maximize line-of-sight visibility with the orbiting satellites. In addition, the ground nodes only transmit throughout a hemisphere, rather than in all spherical directions like the satellite nodes, thus reducing the cost of adding antennas for enhanced link creation.

1. Radio Route Creation and Maintenance

The principles underlying creation of radio links in the satellite mesh systems described herein will first be described by using a paradigm in which all transceivers, both satellites and ground stations, are considered to be nodes in the mesh. This will enable an understanding of how a radio route is created with more than one node-to-node link (that is, with at least three nodes). Creation of a radio link between satellites or a radio link between a satellite and a ground station is in most relevant respects the same. Identifying and optimum radio links and routes between pairs of nodes is in some ways analogous to the manner in which routes are created in the ground-based system described in the inventor's U.S. Pat. Nos. 5,793,842 and 6,459,899. The description of link selection and route creation in those patents is incorporated herein by reference for background information regarding optimum or preferred route creation by the nodes in a radio mesh.

An important difference, though, is that the present system, unlike those known in the prior art, creates routes using nodes the positions and orientations of some of which (the satellites) change over time. Accordingly, while prior fixed-node systems might occasionally have to change a radio route for reasons discussed above in connection with FIG. 1, they did not involve a dynamic environment with moving and tumbling nodes that required the system to be capable of automatically and dynamically updating the selection of transmitting/receiving antenna pairs in the nodes as they move relative to each other and change attitude. For example, Motorola-Iridium systems used satellites with fixed attitudes and known relative positions, thus making possible optimum route creation in a manner known for ground-based systems (although the Motorola-Iridium system is not known to use the nodes themselves to create radio routes).

Figure 5:
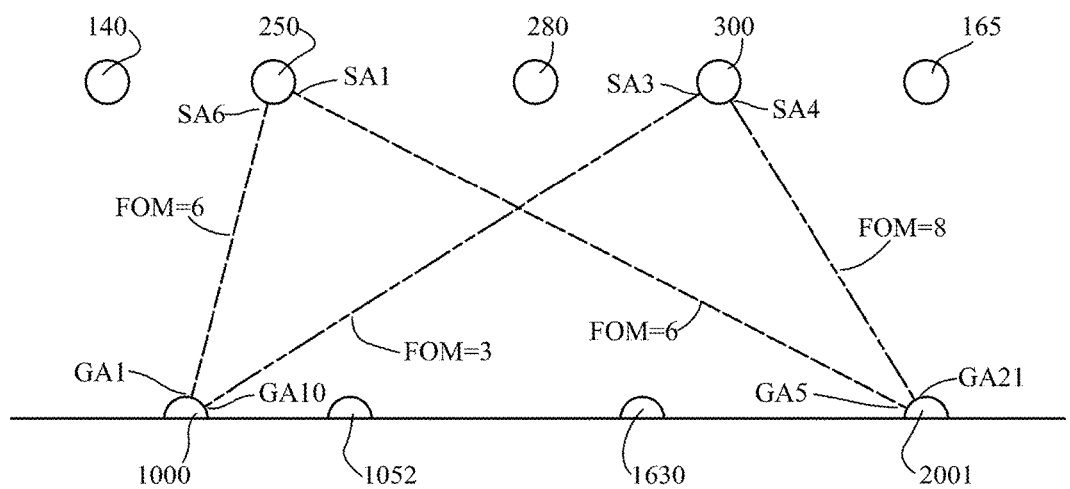
FIG. 5 illustrates an embodiment of a process using a single satellite for creating a radio route between two ground stations.

As just indicated, the present system and method for creating a radio route with robust radio links between nodes involves selecting pairs of antennas and estimating the "quality" of each link by criteria discussed below. An explanatory example will be described in connection with FIG. 5, which shows a plurality of satellites with address nos. 140, no. 250, no. 280, no. 300, and no. 165, which can form radio links with ground stations with addresses no. 1000, no. 1052, no. 1630, and no. 2001. The following explains how the just the nodes in the system determine a preferred radio route for data communications (calls) from ground node no. 2001 to ground node no. 1000 by choosing between two potential routes, one via satellite no. 250 and the other between satellite no. 300. In a typical system there will be about 200 satellites. The number of ground stations can vary, of course, but FIG. 5 illustrates a few such ground stations over a wide area about, say, 700 miles in diameter.

The link selection process is begun by transmitting from each ground node a routing signal in the form of an initial information signal comprising an identifying packet with the initial information. The antenna modules in every node, both satellite nodes and ground nodes, are each given an identifying number. In addition, each node is identified as either a ground node, sometimes referred to as type A, or a satellite node, sometimes referred to as type B. This node identifying data will typically be contained in a packet header, and the identifying packet will include a payload comprising an initial sample data stream. The following Table 1 is an example of digital first information signals transmitted from two of the antenna modules in a first sending ground node, say the node assigned address "1000."

TABLE 1

| Packet No. 1 | |
|---|---|
| Node address no. | 1000 |
| Node type: | A |
| Node antenna no. | GA1 |
| Link count: | 1 |
| Sample data (payload) | XX . . . XX |
| Packet No. 2 | |
| Node address no. | 1000 |
| Node type: | A |
| Node antenna no. | GA4 |
| Link count: | 1 |
| Sample data (payload) | XX . . . XX |

Similar packets will be transmitted continuously from all of the antennas in all of the ground nodes. These signals will be received by a number of other nodes, both ground stations and satellites, but the antenna pairing modules in the nodes will reject information signals sent from the same node type. The satellites also store the number of links back to the sending ground node. In this case, the link count is one.

The initial sample data stream will typically be a known sequence of bits used to evaluate the quality of a potential radio link between two nodes in a manner described just below. It is anticipated that the antennas in each node can transmit the information signals at random intervals without encountering interference with information signals transmitted from other nodes. This is because the number of nodes, and the number of antennas in a given node, that will receive signals from other nodes will likely be small. Alternatively, the antenna modules in the nodes can transmit information signals in preassigned time slots to minimize even further the possibility that an information signal transmitted from one node will arrive at a given antenna in another node at precisely the same time that the given antenna is transmitting its information signal.

Continuing with this example, the second step in the process involves an evaluation by all of the satellite nodes that receive initial information signals from the ground nodes. The process involves a plurality of operations carried out in the satellite antenna pairing and route creation modules. The antenna pairing modules in the receiving satellites store the antenna on which it received the initial information signal. In the FIG. 5 example, satellite no. 250 stores satellite antenna SA6 associated with ground node address no. 1000, and satellite no. 300 stores satellite antenna no. SA3 associated with ground node address no. 1000. The route creation circuitry determines a figure of merit of the received initial information signal that reflects a quality of the signal transmitted over that pair of antennas in the respective ground station and satellite. The figure of merit results from an analysis of certain parameters according to algorithms in the nodes, its purpose being to assign a quantitative value for ranking the suitability of particular antennas in the two nodes as a radio link in the radio route to be created between an originating ground station and a destination ground station. That is, this step in the process involves ranking the quality of a potential radio link between a ground station sending an initial information signal and a satellite receiving it. Examples of properties of received signals that can be used to derive a figure of merit (signal quality) are one or more of signal strength, the error rate in the data stream, and signal-to-noise ratio. In this example, the figure of merit ranges from one (worst quality) to 10 (best quality).

The next step is for the route creation circuitry in all of the satellites to send routing signals in the form of linking information signals from all of their antennas. To illustrate, assume that satellite with address no. 250 receives an initial information signal from sending ground node no. 1000. Table 2 shows the linking information sent in packet form from every antenna in node no. 250 vis-à-vis a potential link with sending ground node no. 1000:

TABLE 2

| | |
|---|---|
| Transmitting from: | Node No. 250 |
| Node type: | B |
| Node transmitting antenna no. | SA1 |
| Node receiving antenna no. | SA6 |
| Linking node address no. | 1000 |
| Linking node antenna no. | GA1 |
| Link count: | 2 |
| Link figure of merit (FOM) | 6 of 10 |
| Sample data (payload) | XX . . . XX |

Table 3 shows the linking information sent in packet form from every antenna in node no. 300 vis-à-vis a potential link with sending ground node no. 1000:

TABLE 3

| | |
|---|---|
| Transmitting from: | Node No. 300 |
| Node type: | B |
| Node transmitting antenna no. | SA4 |
| Node receiving antenna no. | SA3 |
| Linking node address no. | 1000 |
| Linking node antenna no. | GA10 |
| Link count: | 2 |
| Link figure of merit (FOM) | 3 of 10 |
| Sample data (payload) | XX . . . XX |

The linking signals will not be accepted at other satellites, which are the same type (type B) as the satellites no. 250 and no. 300 sending the linking message. In addition, the ground nodes will be programmed likewise to reject linking signals with a linking node address the same as the receiving ground station. Note also that the link count from Table 1 is incremented by one by the satellites, reflecting the number of links (two) to the sending ground node no. 1000.

The antenna pairing circuitry in a receiving ground station that receives a linking signal stores at least the satellite node addresses from which the linking signals were transmitted, as well as the antenna on which the linking signals were received at the receiving ground node. In FIG. 5, the ground station no. 2001 stores satellite address no. 250 associated with antenna no. GA5, and satellite address no. 300 associated with antenna no. GA21. The receiving ground node also determines respective figures of merit for potential links between itself and satellite no. 250 and between itself and satellite no. 300. In this example, the FOM=6 for a potential link between ground station No. 2001 and satellite no. 250 and FOM=8 for a potential link between ground station No. 2001 and satellite no. 300.

A preferred radio route between from the receiving ground station to the sending ground station is then determined based on the figures of merit of the available potential links. In the example shown in FIG. 5, the total figure of merit for the radio route via satellite no. 250 is 12 (6+6) and the total figure of merit for the radio route via satellite no. 300 is 11 (3+8). Therefore, the preferred radio route is via satellite no. 250. Note that it is the quality of the overall route that determines the choice, not the quality of an individual link. As described in more detail below, a data transmission destined for the sending ground station no. 1000 includes the destination address (node no. 1000). The receiving ground station no. 2001 knows that the first radio link in the route to destination node no. 1000 is satellite no. 250 and that a transmission on antenna no. GA5 of ground station no. 2001 will be received at satellite no. 250. (Optionally, the satellite no. 250 can confirm that the transmission is from ground node no. 2001 if the transmission is received on satellite antenna no. SA1.) Satellite no. 250 has stored antenna no. SA6 as the antenna to use for data transmissions to ground station no. 1000. (Optionally, the ground station no. 1000 can confirm that the transmission is from satellite no. 250 if the transmission is received on ground station antenna no. GA1.) Thus, the selected antennas at the ground stations and the satellite (the nodes) direct transmission signals from an originating node to a satellite and then to a destination node without requiring that the entire route being stored at any one node or central location and without requiring a central computer to determine a preferred route. From this example, one skilled in the art will understand how radio routes are constructed for data communications from any of multiple receiving (destination) ground stations to any of multiple sending (originating) ground stations.

It will also be understood that the satellites no. 140, no. 280, no. 165, etc., may also receive initial information signals from the ground station no. 1000 and send linking signals that are received by ground stations no. 1052, no. 1052, no. 1630, and no. 2001. Likewise, all of the satellites shown in FIG. 5 and any others within radio range (see FIG. 2) may receive initial information signals from all of the ground stations no. 1052, no. 1630, and no. 2001, and any others within radio range. However, the determination of a preferred route between any two ground stations proceeds according to the above discussion, in which the combined figure of merit of both potential links in a radio route between the ground stations is evaluated by the receiving ground node of a potential radio routes.

The above steps are continuously repeated at predetermined intervals, including during the transmission of packets of communication signals over a radio route. Thus, as the satellites move and change orientation, the modules in the nodes can continuously update the evaluation of the radio links between nodes, and can change the preferred radio route between originating and destination nodes. This is facilitated by the fact that each node actually only communicates with a limited number of other nodes and thus only a limited number of links has to be updated with each iteration of the link creation process. The frequency of the link refreshing process will depend on various factors, but it is believed that frequencies between 0.5 and 20 Hz will be adequate in a typical system. As already noted, the link selection and maintenance procedure is performed by computations solely using the onboard calculating capacity of the nodes as described herein.

It should be also noted that one node might receive a signal from another node on more than one antenna, depending on the properties of the antenna modules, such as their HPBW. However, the route creation process is the same as described above in that instance. It will also be appreciated that many different criteria can be used to evaluate the quality of the potential link between the nodes. Typical ones would be direct indications of link quality such as the strength of the received signal and the error rate estimate. However, other criteria can be used as well. For example, the amount of remaining battery life in each of the nodes in the potential link could be determined and the quality rating (figure of merit) adjusted by an algorithm that takes into account how long a satellite has been exposed to the sun as an indication that battery power might only remain strong enough to support a link for a short time. Another criterion could be link loading, which refers to the number of potential radio links with other nodes that is stored at a particular node. Each node in the system (ground stations and satellites) can eliminate potential links with a quality below a predetermined threshold (say FOM=2). This will prevent a route from being formed using one very high quality link and one very low quality link, the latter of which may disrupt data communications even though the overall quality of the route appears to be satisfactory. It may also reduce the time required to determine a preferred a radio route by eliminating a number of transmissions between the nodes.

2. Transmitting Data Communications Over the Radio Route

As just explained, once a plurality of links is assembled into a radio route, it can be used to transmit communication signals from an originating node to a destination node. However, one issue that must be addressed when communicating data transmissions over the radio route is that a single antenna in a node cannot both transmit and receive signals simultaneously. This issue is addressed in a variety of ways in the '842 and '899 patents. One that is particularly adapted to the present system is the designation of the nodes as one of two types, called "A" and "B" in this description (or "odd" and "even" in the '842 and '899 patents). In such an arrangement signals transmitted from one type of node are separated in some fashion from signals transmitted from the other type of node so that a node can receive signals on the same antenna that it uses for transmitting signals.

One way of doing this is for one type of node to transmit in certain frequency bands and the other type to transmit in different frequency bands. In this arrangement an antenna in a node can transmit and receive signals at the same time. One drawback is the necessity of providing sufficient separation between the respective frequency bands to ensure that the there is no interference when an antenna is transmitting and receiving at the same time. Another way of separating signal transmission and reception is to transmit from one type of node in a particular time slot and from the other type of node in a different time slot interleaved with the first time slot.

Data/communication signal transmission in accordance with this description is controlled by the data movement modules 48 in the satellites 10. For example, a data communication comprising packets of data with a header and a payload will be received at an originating ground station. The header will typically include address information, including identification of the destination ground station. The data transmission module unpacks the address information and indicates the system address (node number) of the destination node. The packets will then be sent to the destination ground station over the radio route established in the manner described above. An important aspect of the present system is that the preferred radio routes are subject to change even during an ongoing data transmission. However, the data packets arriving at the destination ground station can be unpacked, undergo error correction, and be reassembled in the proper order in accordance with known principles, even if the packets arrive out of order because they traveled via different routes or were delayed while a different route was being created.

3. Summary

It will be apparent to those skilled in the art that the present system is not simply a superposition of the route creation techniques described in the '842 and '899 patents on a three-dimensional mesh in which the nodes include satellites instead of fixed devices in an essentially two-dimensional space. There are numerous factors that go into link selection and route creation, some of which are discussed above, that must be accounted for in the type of space-based, three-dimensional mesh described herein. For example, since the satellites have different trajectories, some of which will pass over large expanses of unpopulated oceans, while others will pass over land masses that will generate more data transmissions, battery life can vary greatly from satellite to satellite. Accordingly, the amount battery charge remaining can be an important parameter in selecting a satellite as a node in a radio route.

The use of a single satellite to establish an optimum or preferred radio route has several advantages. One is that it identifies a preferred route virtually instantaneously because the radio signals passed between the satellites and the ground stations include information that is used by algorithms stored at the ground stations and in the satellites to calculate a preferred radio route in small fractions of a second. Thus, as soon as a ground station transmits a signal indicating that a route is needed to another ground station, the route can be established immediately and used for transmitting communication signals. This type of three-node route can "refresh" sufficiently rapidly to minimize disruptions of data transmissions so that if at a later time a different satellite, or different antennas on the same satellite, would provide a better quality route, the route configuration can be adjusted nearly instantaneously to provide better quality links and minimize delays in data transmission. It also allows for changing the satellite used in the route for other reasons, an example being waning battery life Those skilled in the art will understand that engineering a system in accordance with the above description will require trade-offs among different aspects of the system. Thus, an actual system will likely involve many competing considerations in optimizing a particular design. Some of these considerations are the number of satellites, satellite altitude, the number of antennas, particularly in the satellites, the beam width of the antennas, the size of the satellites, the cycle time for updating route creation, just to name a few.

B. Examples of Radio Routes Created Using the Present System

An aspect of the present embodiment is that the probability of there being at least one satellite present to establish a ground-to-satellite-to-ground radio route can be readily increased by simply placing more satellites in orbit, in accordance with the description above. Since the satellites are very light and inexpensive, increasing their number is an economically feasible way of increasing the reliability of the system. Although there may be periods when there is no satellite immediately available for the establishment of a radio route between two ground stations, the rapid rate at which the system can refresh itself increases the probability that at least one satellite will soon (likely within a few seconds) become available. In most applications, a time lag with a duration of this order of magnitude will be acceptable. For those reasons, a particularly useful application of the present embodiment is providing reliable radio routes over particular geographic areas.

1. Establishing a Single-Satellite Route in a Particular Geographic Area

Figure 6:
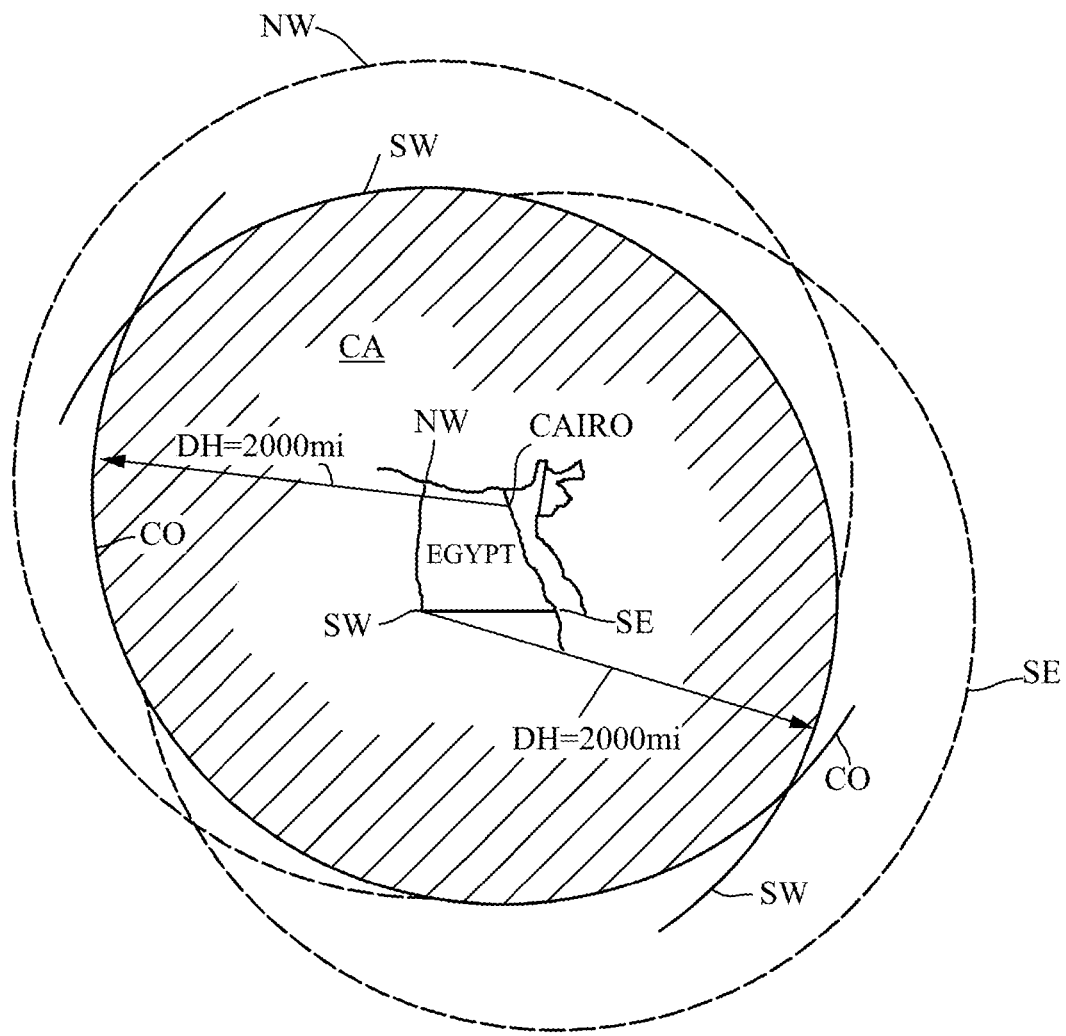
FIG. 6 illustrates how a satellite radio mesh system as described herein using a single satellite can be used to provide radio routes within a prescribed geographical area such as the country of Egypt.

FIG. 6 illustrates an application of this aspect of the invention in which the plurality of randomly orbiting satellites is used to create a ground-to-single-satellite radio route over which signals can be transmitted and received only over a predetermined geographical area. The example presented here is a system for transmitting and receiving communication signals throughout the country of Egypt. FIG. 6 is a map of Egypt that shows a coverage area CA in which a single satellite is used to effect communications between Cairo and the southwest corner SW of the country. As above, the system includes 200 satellites. The circle segment labeled CO indicates an area in which a satellite will see Cairo. The circle segment labeled SW indicates the area in which a satellite will see the southwestern corner SW of the country. The area CA represents the overlap of these circles, signifying the area where both Cairo and the southwest corner SW will see the same satellite.

The area CA of the overlapping circles CO and SW is given by the following relation:

$$CA = 2DH^2 \cos^{-1}\left(\frac{m}{2DH}\right) - \frac{m}{2}(4DH^2 - m^2)^{\frac{1}{2}}$$

where m=700 miles, which is the distance between Cairo and SW, and DH is the distance to the horizon from a satellite (see FIG. 2). Accordingly, the area CA in which a single satellite will enable communication between ground stations at Cairo and the southwest corner SW is about 9,800,000 sq. mi. By the calculation above in connection with FIG. 2, the coverage area CA is about 5.0% of the earth's surface. If there are 200 satellites in random orbits per the present description, there will be on average at least 10 satellites visible from any point within the coverage area. Stated another way, the probability that at least one satellite will not be available for communication between Cairo and SW is only $0.95^{200} \cong 0.0035\%$ (or about 35 in a million). In an actual implementation the area will be somewhat less because the closer a satellite is to the horizon for a particular location, the less likely it is to be able to receive radio signals from a ground station at that location due to atmospheric effects or interference from nearby buildings or topographical features such as mountains or the like. The ability of a ground station to see satellites near the horizon can be improved by placement of the ground nodes on high towers or hills or tall buildings. Since ground stations will typically use utility power, there is normally little or no constraint on the power available at ground stations. In addition, the ground stations can utilize antenna designs that increase weight, while in the satellites the goal is generally to reduce weight to minimize launch costs. In other words, the engineer designing the system would have much more flexibility in configuring the ground stations to increase their effective range and thus make more satellites available for single-satellite route creation than might otherwise be available if the ground stations had the same antenna modules in the same numbers as the satellites.

FIG. 6 uses the dotted circle segments to indicate the coverage area for communications with other ground stations, such as the northwest corner NW and southeast corner SE of the country. For example, a satellite would have to occupy the overlap between the two circles labeled NW and SE for communications between ground stations at those locations. Stated another way, any single satellite within that area would support a radio route between those ground stations. As another example, any satellite within the overlapping area of two 2000-mile radius circles centered on Cairo and SE would support a radio route between ground stations at those two locations. The same principle applies to communications between two ground stations located at Cairo and NW, and so forth.

A radio route is established between two ground stations (say at Cairo and near SW) in the manner described above for establishing radio links between nodes. While in the present embodiment a given radio route will only include a single satellite because all satellites are nodes of one type and all ground stations are nodes of a different type, the route need not necessarily comprise only a single satellite. Nevertheless, it is expected the route creating modules in the nodes will inherently favor single-satellite radio routes because they will likely provide a preferred route in terms of the collective figures of merit of the links in such a route. In addition, a radio route is maintained between the two ground stations even if the satellite originally used to create the route disappears over the horizon and from the view of one of the two ground stations (see FIGS. 2A and 2B). In that case, the computers aboard a different satellite in view of both ground stations can be used to create a new radio route. During the brief times that could theoretically occur when no route is available, the transmission data is stored in a buffer memory until a route is available. As noted above, the communication data packet headers include sequence information that permit them to be reassembled in order at the destination node for transmission to a user connected to the destination node via a landline or WiFi.

2. Single-Satellite Routes with Wide Area Coverage

Figure 7:
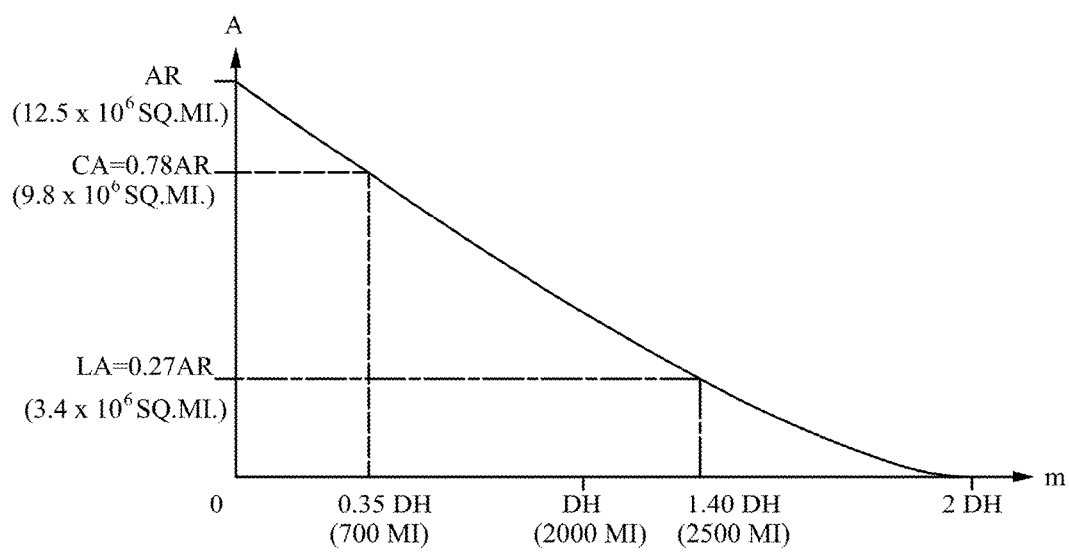
FIG. 7 illustrates the relation between the distance separating two points on the earth's surface and the overlapping area of two intersecting circles centered on the respective points.

FIG. 7 plots the general relationship between the distance separating two ground stations and the area in which two circles centered on respective stations overlap with each other. If the two points are about 700 miles apart (as in the example above using Egypt), the overlapping area CA of two circles with a diameter DH of 2000 miles is about 78% of the area AR (FIG. 2). As the distance increases, the overlapping area correspondingly decreases. FIG. 7 shows the overlapping area LA of two circles centered on New York and Los Angeles. That area is about 3,400,000 sq. mi., which is only 27% of the area AR covered by a single satellite. This represents only 1.7% of the earth's surface of 197,000,000 sq. mi. For a system comprising 200 satellites, there only will be about 3 or 4 satellites visible from both cities. Considering that the Rocky Mountains will intercept westward signals toward Los Angeles at shallow angles to the earth's surface, there may in fact be no satellite capable of communicating with both cities for long periods of time. Russia presents an even more extreme situation. The distance between Vladivostok and St. Petersburg is about 4000 miles, meaning that in no case will a single satellite be capable of providing a radio route between them. Even cities closer together in Russia may not present a sufficiently large probability of establishing a single-satellite radio route between them if they are on opposite sides of the Ural Mountains.

The single satellite embodiment of the invention is readily adapted to settings where ground nodes are too far apart, or where topographical features will severely limit the number of satellites visible to both ground nodes. In that case one or more intermediate ground nodes are provided between the distant locations. The intermediate ground stations will appear to the system just like the satellite nodes. To illustrate the point, consider a system in which ground nodes are located at New York, Kansas City, and Los Angeles. The route creation algorithms in the satellites visible to the New York/Kansas City ground nodes will determine a first preferred radio route segment and those in the satellites visible to Kansas City/Los Angeles ground nodes will determine a second preferred radio route segment in series with the first. Although the route will not necessarily be constrained to comprise two single satellite route segments (New York/Kansas City and Kansas City/Los Angeles), it is believed that will typically be the end result. The link count discussed above could be used as a factor in selecting the preferred radio route between two distant ground stations, which in some circumstances could result in a single satellite radio route.

However, the system will be free, as discussed, to create a route, say, between New York and Los Angeles using a single satellite, or an intermediate satellite/satellite link if the route creation algorithm in the nodes so dictates. Satellite-to-satellite links can be established if a sufficient number of satellites of the same "type" as the ground stations are placed into orbit. These satellites would function as a kind of blind node that could only be used for communications between satellites of the other type but not with ground stations. It is expected that a limited number of such blind node satellites would be required because of the great distances over which orbiting satellites would able to see each other.

3. Additional Properties of Single Satellite Radio Routes

One property of the mesh system described herein is the ability to restrict data communications to particular ground stations. For example, if security concerns required that certain communications from a ground station only be capable of transmission to one or more other ground stations, the packet header could include encrypted information that could only be decoded by a ground station with a suitable decryption key. The communication could be double encrypted by including an encryption key in the information signals used to create radio links as well as in the data communications themselves. The same principle could be used to prevent communications to certain ground stations in general. For example, in the example above relating to a system deployed for communication between ground stations in Egypt, data packets sent from a ground station could include an address field permitting the creation of radio routes only with other ground stations in Egypt. This type of single or double encryption could also be employed by a country for political or religious reasons.

IV. OTHER MODIFICATIONS AND VARIATIONS

It will be appreciated that numerous variations and modifications of the structures and methods described heretofore are possible within the scope of the present invention. The above exemplary embodiment uses addition of the figures of merit of two potential radio links to select a preferred radio route. However, the invention encompasses other ways of determining a preferred route, since using the sums of the figures of merit for two different potential radio routes would favor a multiple satellite route over a single satellite route. Thus, although addition of the figures of merit in a single satellite route will typically result in an optimum or preferred route, more complex and sophisticated algorithms may be necessary to implement this aspect of the invention when choosing between potential single- and multiple-satellite routes or between two potential multiple-satellite routes. One possible approach in those situations would be to select a particular route when other potential routes would include a link judged to be inferior for one or more reasons, some examples of which are discussed above (inadequate signal strength and/or excessive error rate between various nodes in a potential multiple satellite route, low remaining satellite battery life, excessive link loading, or eliminating potential links with figures of merit below a predetermined threshold).

Those skilled in the art will recognize that "figure of merit" as discussed herein is simply one way of articulating the important concept of choosing a radio route deemed to be optimum for data communications between two ground stations. The parameters used in determining a figure of merit for a particular potential link are not limited to those specifically pointed out in this description. One example would take into account that the satellites are moving relative to each other, so that the quality of potential links between satellites or between a satellite and a ground station will change over time. Thus, one of the factors in selecting a link could be the derivative of link quality (figure of merit) with respect to time, since a positive value would indicate that the link quality would increase and thus be more stable, while a negative value would indicate the opposite.

V. SUMMARY AND CONCLUSION

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. A radio communications system comprising multiple satellites orbiting the earth in random orbits for providing a radio route for data communications between transceivers at two ground station locations, each satellite and ground station comprising a node of the system, wherein each of a plurality of the satellites includes:

a plurality of satellite antennas for receiving radio signals from a plurality of other nodes including at least one ground station node and for transmitting radio signals;

antenna pairing circuitry for storing address information identifying a ground station node from which the satellite received a first routing radio signal including a sample digital data stream and identifying the satellite antenna on which the satellite received the first routing radio signal; and route creation circuitry for transmitting further routing radio signals from a plurality of the satellite antennas, wherein:

the further routing radio signals include (i) linking information identifying the satellite, and (ii) a quality of the received first routing radio signal, wherein the quality indicates a suitability of the satellite and the ground station node from which the first routing radio signal was received as a radio link in the radio route between the two ground station locations, the further routing radio signals comprise packets of digital data, each packet including (i) a header containing the linking information and the quality of the first routing radio signal, and (ii) a payload including a sample digital data stream used by another node receiving a further routing radio signal to determine the quality of the further routing radio signal, and the quality of a received routing radio signal is expressed as a quantitative figure of merit based at least in part on a property of the sample digital data stream included in the received routing radio signal.

2. A system as in claim 1, wherein the satellite antennas are directional antennas.

3. A system as in claim 2, wherein the satellite antennas are arranged to transmit and receive radio signals over substantially the entire spherical space surrounding each of the satellites.

4. A system as in claim 2, wherein the satellite antennas are arranged to transmit and receive radio signals over less than the entire spherical space surrounding each of the satellites.

5. A system as in claim 1, wherein the satellite nodes are designated as a first type and the ground station nodes are designated as a second type, and each type of node can only communicate with a node of a different type.

6. A system as in claim 1, wherein the property is based at least in part on an error rate of the sample digital data stream.

7. A system as in claim 1, wherein each of the plurality of the satellites further includes a plurality of solar panels, wherein regardless of satellite orientation at least one solar panel generates electricity when the satellite is exposed to solar radiation.

8. A system as in claim 7, wherein each of the plurality of the satellites further includes a power module including at least one rechargeable battery for providing electrical power to the satellite antennas, antenna pairing circuitry, and route creation circuitry, the battery being charged by the at least one solar panel when the satellite is exposed to solar radiation.

9. A system as in claim 7, wherein the solar panels are disposed relative to the satellite antennas to permit substantially unobstructed transmission and reception of radio signals by the antennas.

10. A system as in claim 1, wherein the satellites further include a plurality of solar panels mounted in fixed relation to the satellite.

11. A system as in claim 10, wherein regardless of satellite orientation at least one solar panel generates electricity when the satellite is exposed to solar radiation.

12. A method for creating a radio communication route for data communications from a receiving ground station to a sending ground station, wherein the ground stations include a plurality of ground station directional antennas for transmitting and receiving radio signals, the method comprising:
(a) providing multiple satellites orbiting the earth in random orbits, wherein each satellite and ground station comprises a node of the system, and each of a plurality of the satellites includes (i) a plurality of satellite directional antennas for receiving radio signals from a plurality of other nodes including at least one ground station node and for transmitting radio signals, and (ii) antenna pairing circuitry for storing address information identifying a ground station node from which the satellite received a routing radio signal and identifying the satellite antenna on which the satellite received the routing radio signal;
(b) receiving at a satellite antenna of at least one satellite an initial information routing radio signal transmitted from an antenna at a sending ground station;
(c) storing at any satellite receiving the initial information routing radio signal at least (i) address information identifying the ground station from which the initial information routing radio signal was received, and (ii) the satellite antenna on which the initial information routing radio signal was received;
(d) transmitting linking information routing radio signals from a plurality of the antennas of at least one satellite receiving the initial information routing radio signal, wherein the linking information routing radio signals include (i) linking information identifying the satellite, and (ii) the quality of the received initial information routing radio signal indicating a suitability of the satellite and the sending ground station as a radio link in a radio communication route between the ground stations;
(e) storing at a receiving ground station receiving at least one linking information routing radio signal (i) address information identifying the satellite transmitting the linking information routing radio signal, (ii) the receiving ground station antenna on which the linking information routing radio signal was received, and (iii) the quality of the initial information routing radio signal received at the satellite transmitting the linking information routing radio signal; and
(f) determining a preferred radio communication route for data communications from the receiving ground station to the sending ground station via a particular satellite based on (i) the quality of the received linking information routing radio signal indicating a suitability of the receiving ground station and the particular satellite as a radio link in a radio communication route between the ground stations, and (ii) the quality of the initial information routing radio signal, wherein the routing radio signals comprise digital data streams and the quality of a received routing radio signal is expressed as a quantitative figure of merit based at least in part on a property of the digital data stream.

13. A method as in claim 12, wherein the satellite nodes are designated as a first type of node and the ground station nodes are designated as a second type of node, and each type of node can only communicate with a node of a different type.

14. A method as in claim 13 further including sending a data transmission from an origin comprising the receiving ground station to a destination comprising the sending ground station, wherein the first type of node only transmits radio signals in a first mode and only receives radio signals in a second mode that substantially eliminates interference with transmissions in the first mode, and the second type of node only receives radio signals in the first mode and only transmits radio signals in the second mode.

15. A method as in claim 12, wherein:
the initial information routing radio signal comprises packets of digital data including a header containing at least the sending ground station address information and a payload including a sample digital data stream used by the satellite to determine the quality of the received initial information routing radio signal; and the linking information routing radio signal comprises packets of digital data including a header containing at least the linking information and the quality of the received initial information routing radio signal and a payload including a sample digital data stream used by the receiving ground station to determine the quality of the received linking information routing radio signal.

16. A method as in claim 15, wherein the qualities of the initial information routing radio signal received by the satellite and the linking information routing radio signal received by the receiving ground station are expressed as quantitative figures of merit based at least in part on an error rate of the respective sample digital data streams.

17. A method as in claim 16 further including communicating a data transmission comprising packets of digital data from an origin comprising a receiving ground station to a destination comprising a sending ground station, each data transmission packet including a header including the address information of the destination and a payload including a digital data stream representing the content of the transmission, wherein:
the origin transmits the packet of digital data to the particular satellite using the receiving ground station antenna on which the linking information routing radio signal was received; and
the particular satellite transmits the packet of digital data transmission to the destination using the antenna of the particular satellite on which the initial information routing radio signal was received.

18. A method as in claim 17, wherein the data transmission includes a plurality of packets and the header includes sequence information indicating the original order of the packets comprising the content of the transmission, and the destination uses the sequence information to place the packets in the original order.

19. A method as in claim 12, wherein the satellite antennas are arranged to transmit and receive radio signals over substantially the entire spherical space surrounding the satellites and the ground station antennas are arranged to transmit and receive radio signals over substantially the entire spherical space above the surface of the earth surrounding the ground stations.

20. A method as in claim 12, wherein the satellite antennas are arranged to transmit and receive radio signals over less than the entire spherical space surrounding each of the satellites.

21. A method as in claim 12, wherein the determining step is performed by the receiving ground station without a central computer communicating with the satellites or other ground stations.

22. A radio communications system comprising multiple tumbling satellites orbiting the earth in random orbits for providing a radio route for data communications between transceivers at two ground station locations, each satellite and ground station comprising a node of the system, wherein each of a plurality of the satellites includes:
a plurality of satellite antennas for receiving radio signals from a plurality of other nodes and for transmitting radio signals;
antenna pairing circuitry for storing address information identifying another node from which the satellite received a routing radio signal with a quality indicating a suitability of the satellite and the other node as a radio link in the radio route and identifying the satellite antenna on which the satellite received the routing radio signal, wherein the routing radio signal comprises a digital data stream and the quality of a received routing radio signal is expressed as a quantitative figure of merit based at least in part on a property of the digital data stream; and
a plurality of solar panels, wherein regardless of satellite orientation at least one solar panel generates electricity when the satellite is exposed to solar radiation.

23. A system as in claim 22, wherein the solar panels are mounted in fixed relation to the satellite.

24. A system as in claim 22, wherein the property is based at least in part on the content of the digital data stream.

25. A radio communications system comprising multiple satellites orbiting the earth in random orbits for providing a radio route for data communications between transceivers at two ground station locations, each satellite and ground station comprising a node of the system, wherein each of a plurality of the satellites includes:
a plurality of satellite antennas for receiving radio signals from a plurality of other nodes including at least one ground station node and for transmitting radio signals; and
antenna pairing circuitry for storing address information identifying a ground station node from which the satellite received a routing radio signal and identifying the satellite antenna on which the satellite received the routing radio signal, wherein the routing radio signal comprises a digital data stream and the quality of a received routing radio signal is expressed as a quantitative figure of merit based at least in part on a property of the digital data stream.

26. A system as in claim 25, wherein the satellite antennas are directional antennas.

27. A system as in claim 26, wherein the satellite antennas are arranged to transmit and receive radio signals over substantially the entire spherical space surrounding each of the satellites.

28. A system as in claim 26, wherein the satellite antennas are arranged to transmit and receive radio signals over less than the entire spherical space surrounding each of the satellites.

29. A system as in claim 25, wherein the property is based at least in part on the content of the digital data stream.

30. A radio communications system comprising multiple satellites orbiting the earth in random orbits for providing a radio route for data communications from an originating ground station to a particular destination ground station, the data communication including encrypted content accessible only by use of one or more decryption keys matched with the encrypted content, each satellite and ground station comprising a node of the system, wherein:
each of a plurality of the satellites includes a plurality of satellite antennas for receiving radio signals from a plurality of other nodes and for transmitting radio signals, antenna pairing circuitry for storing address information identifying another node from which the satellite received a routing radio signal with a quality indicating a suitability of the satellite and the other node as a radio link in the radio route and identifying the satellite antenna on which the satellite received the routing radio signal, and route creation circuitry for using the routing radio signals to create a radio route from the originating ground station to the particular destination ground station;
only the particular destination ground station includes one or more decryption keys enabling access to the encrypted content in the data communication; and
the routing radio signals comprise digital data streams and the quality of a received routing radio signal is expressed as a quantitative figure of merit based at least in part on a property of the digital data stream comprising the received routing radio signal.

31. A system as in claim 30, wherein the route creation circuitry transmits routing radio signals from a plurality of the satellite antennas, wherein the routing radio signals include (i) linking information identifying the satellite, and (ii) the quality of at least one routing radio signal received by the satellite transmitting the linking information.

32. A system as in claim 31, wherein the satellite nodes are designated as a first type and the ground station nodes are designated as a second type, and each type of node can only communicate with a node of a different type.

33. A system as in claim 30, wherein the property is based at least in part on the content of the digital data stream.

34. A radio communications system comprising multiple satellites orbiting the earth in random orbits for providing a radio route for data communications between transceivers at two ground station locations, each satellite and ground station comprising a node of the system, wherein each of a plurality of the satellites includes:
a plurality of satellite antennas for receiving radio signals from a plurality of other nodes and for transmitting radio signals; and
antenna pairing circuitry for storing address information identifying another node from which the satellite received a routing radio signal with a quality indicating a suitability of the satellite and the other node as a radio link in the radio route and identifying the satellite antenna on which the satellite received the routing radio signal, wherein a routing radio signal transmitted from a node comprises a packet of digital data including (i) a header containing the linking information and the quality of the received routing radio signal, and (ii) a payload including a sample data stream used by another node receiving a routing radio signal to determine the quality of the routing radio signal received from the satellite, with the quality of the received routing radio signal being expressed as a quantitative figure of merit based at least in part on an error rate of the sample data stream.

35. A system as in claim 34, wherein the satellite antennas are directional antennas.

36. A system as in claim 35, wherein the satellite antennas are arranged to transmit and receive radio signals over substantially the entire spherical space surrounding each of the satellites.

37. A system as in claim 35, wherein the satellite antennas are arranged to transmit and receive radio signals over less than the entire spherical space surrounding each of the satellites.

38. A system as in claim 34, wherein the routing radio signals comprise a digital data stream transmitted from the nodes and the quality of the receiving routing radio signal is expressed as a quantitative figure of merit based at least in part on the content of the data stream.

* * * * *